United States Patent [19]

Luo

[11] Patent Number: 5,519,572
[45] Date of Patent: May 21, 1996

[54] COMPUTER PERIPHERAL APPARATUS

[76] Inventor: Hsin-Yi Luo, No. 33-5, Lin 13, Pai Yu Tsun Kuan Yin Hsiang, Taoyuan Hsien, Taiwan

[21] Appl. No.: 346,495

[22] Filed: Nov. 29, 1994

[51] Int. Cl.⁶ ..................................................... H05K 5/00
[52] U.S. Cl. ........................ 361/685; 361/683; 360/97.01; 381/87; 381/88
[58] Field of Search .................................. 361/683–686; 381/90; 360/97.01–97.03

[56] References Cited

U.S. PATENT DOCUMENTS

| | | | |
|---|---|---|---|
| 5,448,495 | 9/1995 | Liu | 361/683 |
| 5,448,647 | 9/1995 | Koizumi | 381/90 |

Primary Examiner—Leo P. Picard
Assistant Examiner—Jayprakash N. Gandhi
Attorney, Agent, or Firm—Merchant, Gould, Smith, Edell, Welter & Schmidt

[57] ABSTRACT

A computer peripheral apparatus including a mainframe housing to hold diskdrives, and two speaker housings respectively fastened to opposite sides of the mainframe housing to hold respective speakers, the mainframe housing consisting of an outer casing, an inner casing mounted within the outer casing, and a top cover covered on the outer and inner casing, the speaker housings having retainer lugs respectively fastened to respective speaker mounting holes on the outer casing, the outer casing having spring devices, which automatically block the speaker mounting holes when the speaker housings are disconnected from the mainframe housing.

5 Claims, 17 Drawing Sheets

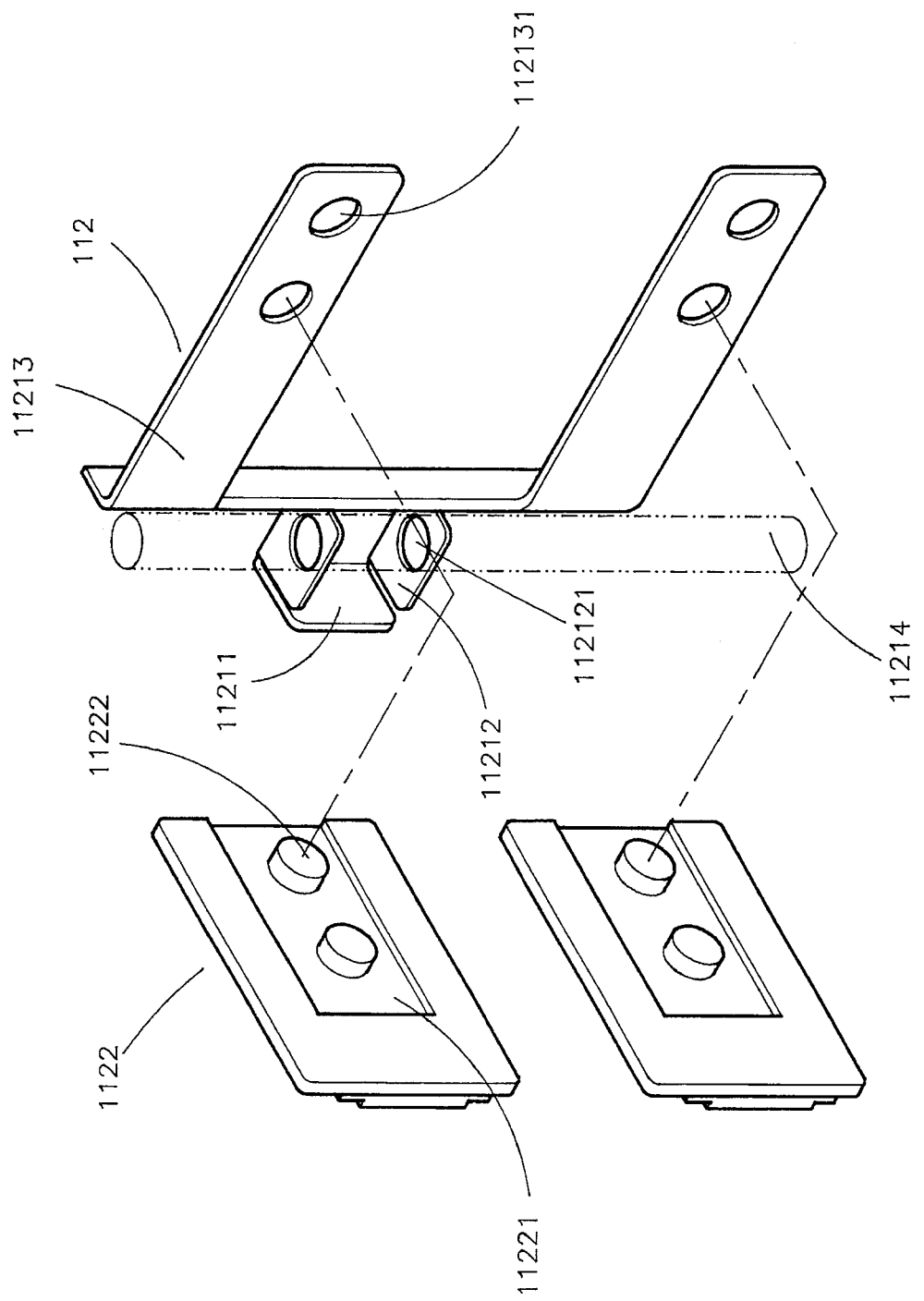

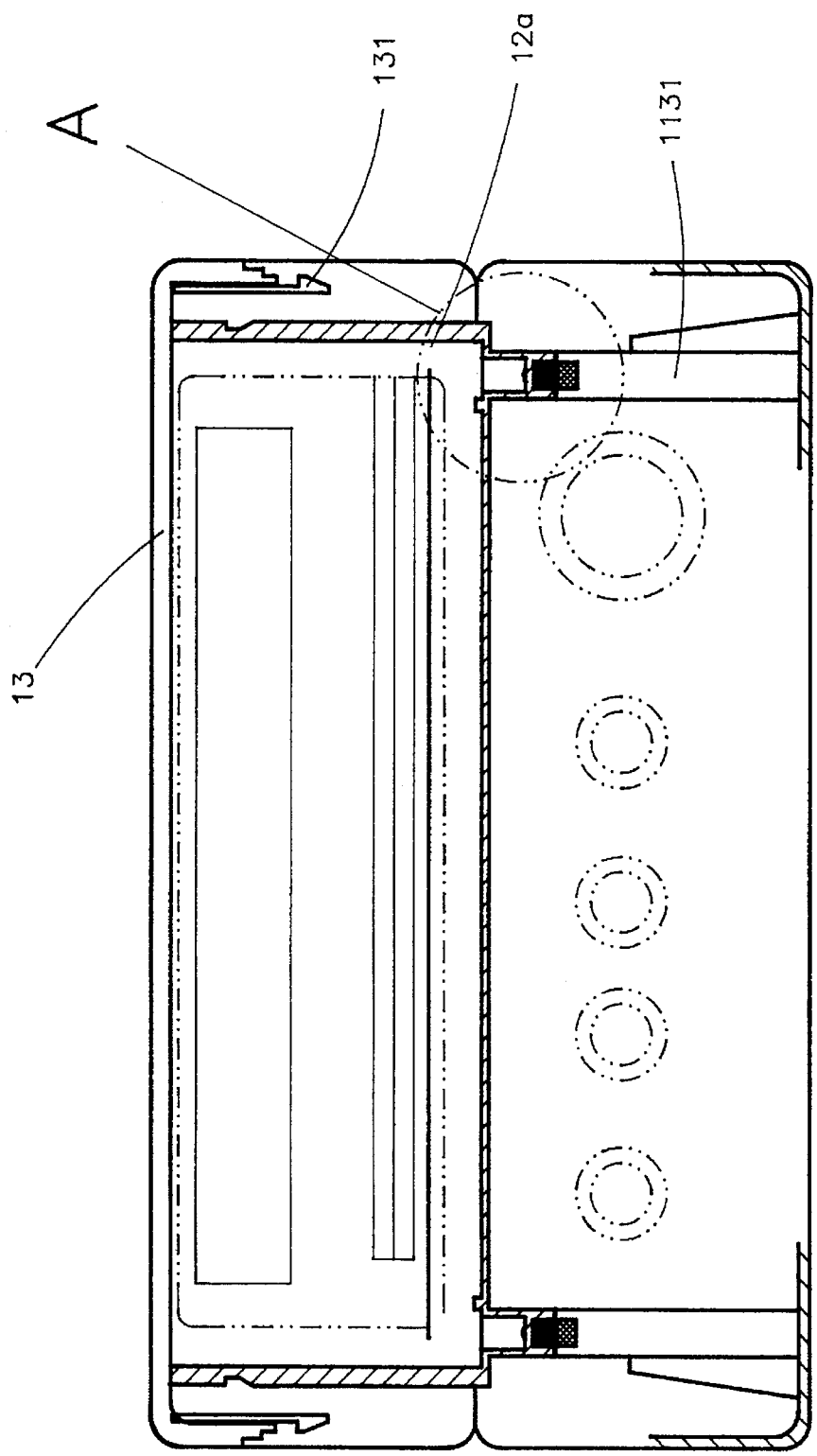

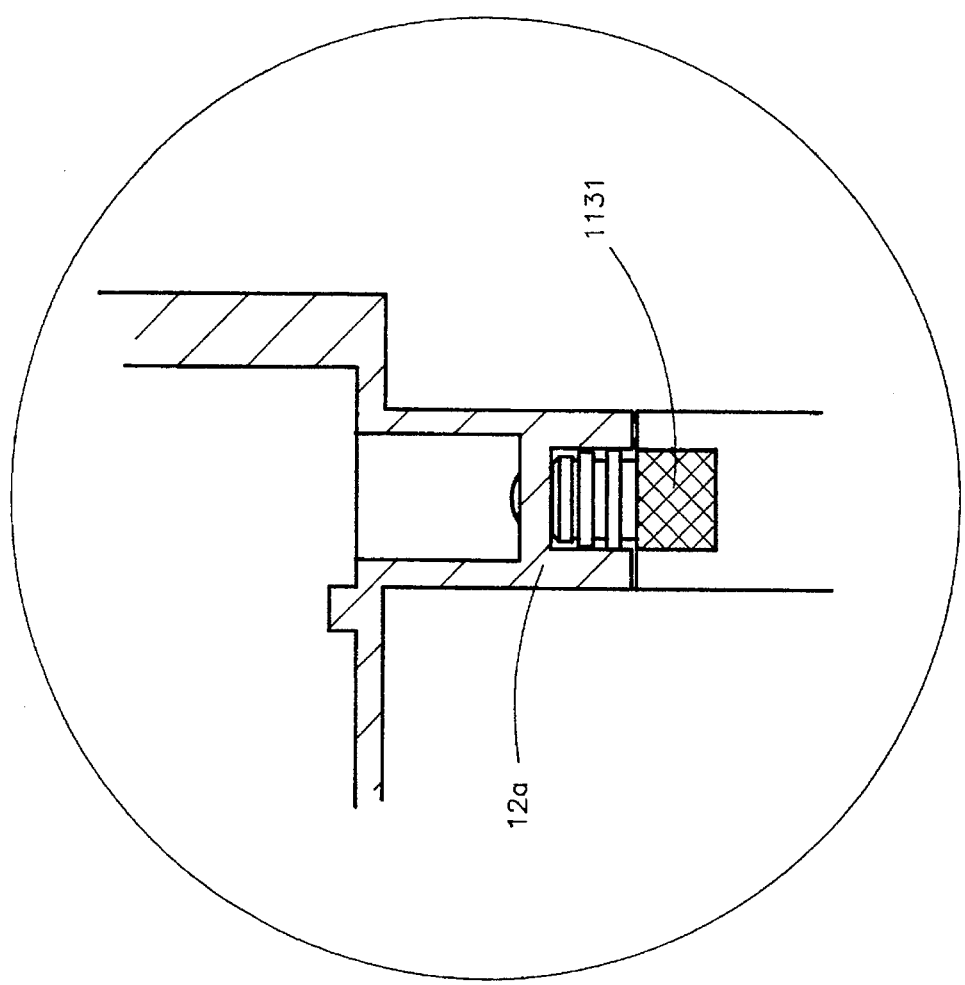

5,519,572

COMPUTER PERIPHERAL APPARATUS

BACKGROUND OF THE INVENTION

The present invention relates to computer peripheral apparatus, and relates more particularly to such a computer peripheral apparatus which has a mainframe housing and two speaker housings detachably connected together to hold diskdrives and speakers, permitting them to be detachably connected to a computer.

Various multi-media computer systems are well known, and intensively used in different fields. A variety of peripheral apparatus have been disclosed for use with multi-media computer systems, and have appeared on the market. For example, a diskdrive array mainframe is provided for holding a plurality of diskdrives for connection to a computer system. However, this structure of diskdrive array mainframe has a limited space for holding a limited number of diskdrives. Furthermore, various audio equipment have been developed for use with computer systems through sound cards. However, the installation cost is high for equipping a computer system with an external diskdrive array mainframe and an external audio equipment.

SUMMARY OF THE INVENTION

It is one object of the present invention to provide a computer peripheral apparatus for a computer system which combines a mainframe housing and two speaker housings together to hold diskdrives and speakers. It is another object of the present invention to provide a computer peripheral apparatus for a computer system which allows the user to attach a large number of external diskdrives to the computer system.

According to the preferred embodiment of the present invention, the computer peripheral apparatus comprises a mainframe housing to hold diskdrives, and two speaker housings respectively fastened to two opposite sides of the mainframe housing to hold respective speakers. The mainframe housing consists of an outer casing, an inner casing mounted within the outer casing, and a top cover covered on the outer and inner casing. The speaker housings have retainer lugs respectively fastened to respective speaker mounting holes on the outer casing. The outer casing has spring devices which automatically block the speaker mounting holes when the speaker housings are disconnected from the mainframe housing.

BRIEF DESCRIPTION OF THE DRAWINGS

FIG. 3 is an exploded view of a spring device according to the present invention;

FIG. 5 is a schematic drawing showing the connection between the top cover and the outer casing according to the present invention;

DETAILED DESCRIPTION OF THE PREFERRED EMBODIMENT

Figure 1:
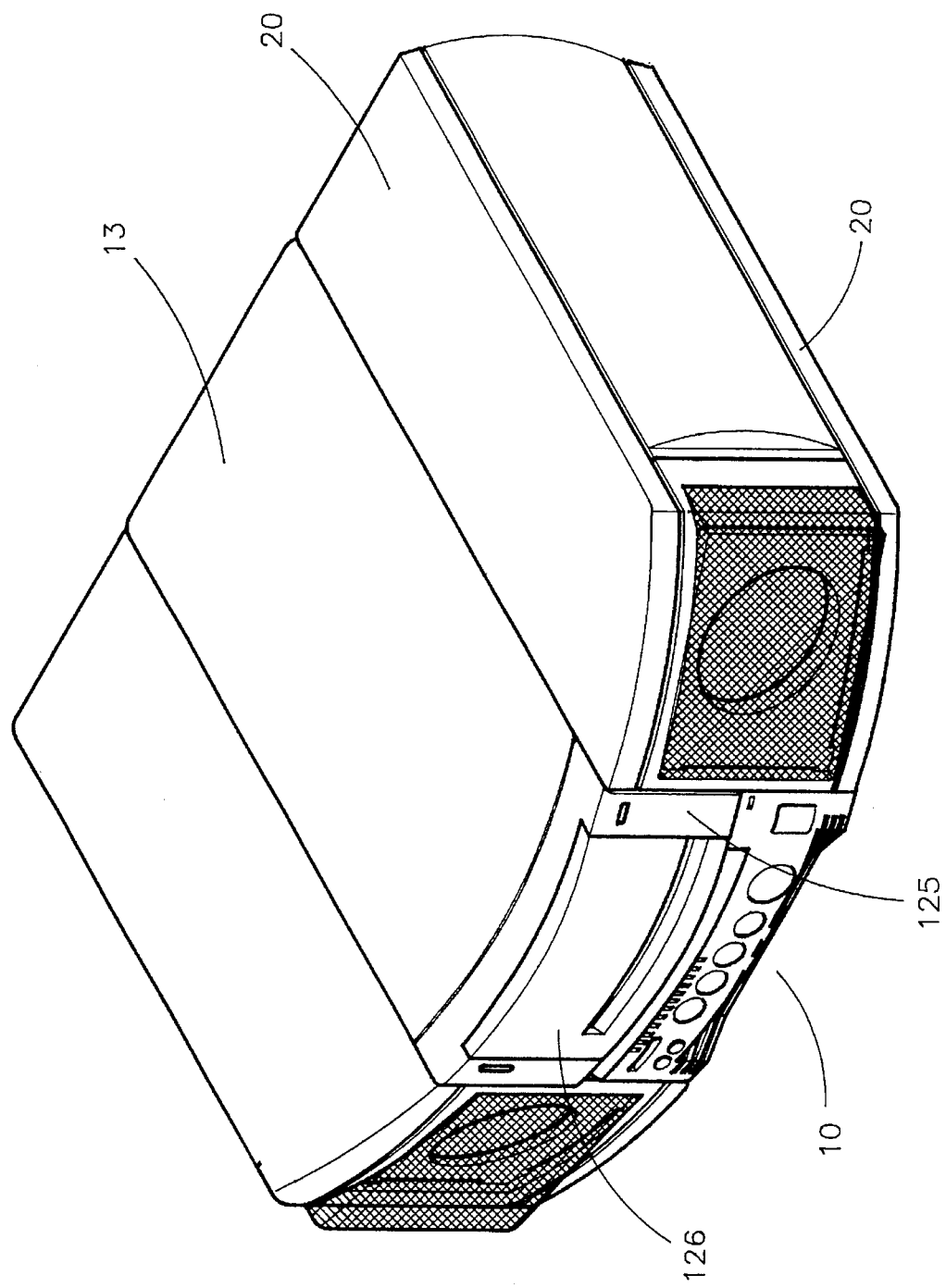
FIG. 1 is an elevational view of a computer peripheral apparatus according to the present invention.
Figure 2:
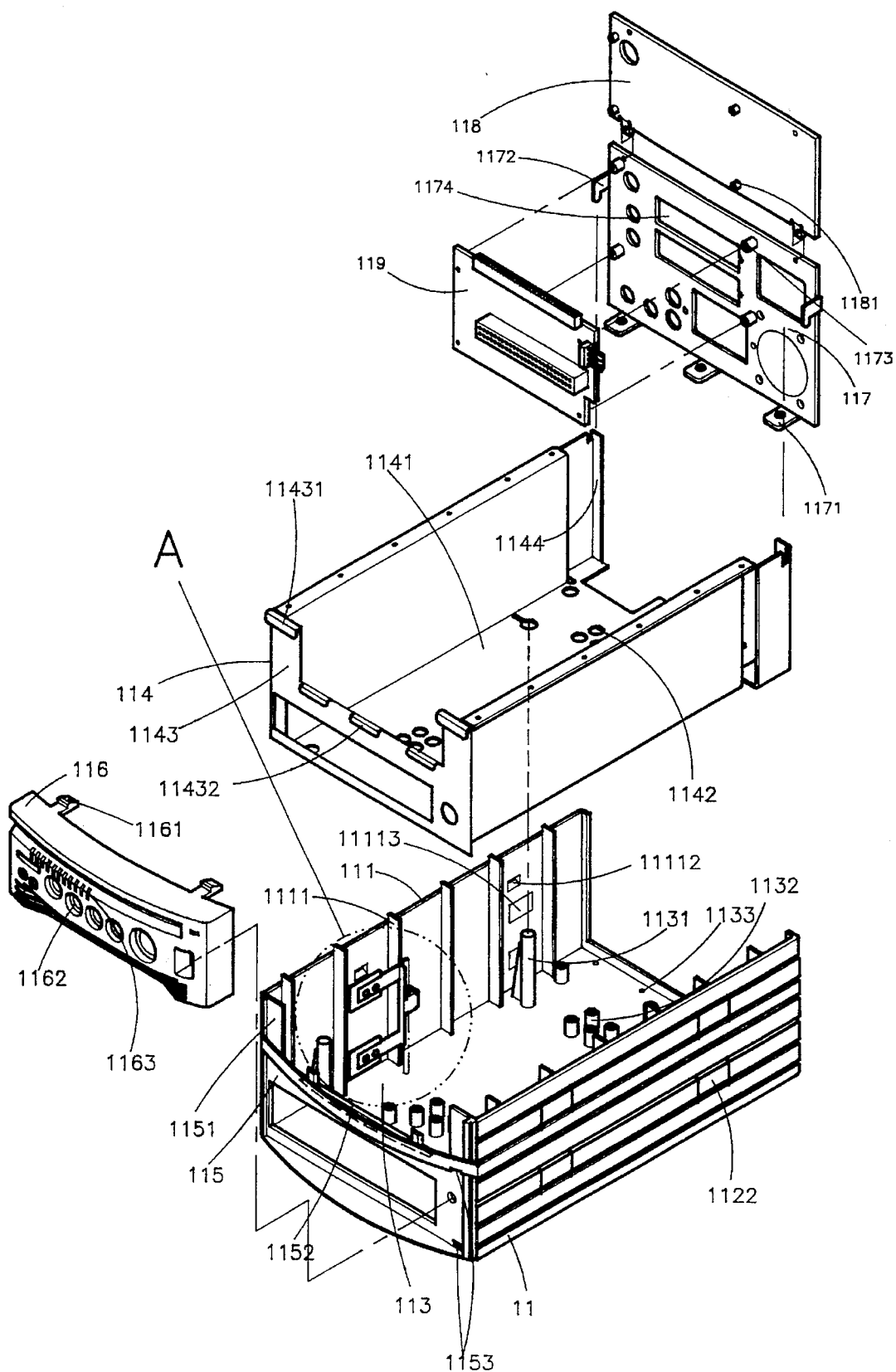
FIG. 2 is an exploded view of the outer casing of the mainframe housing of the computer peripheral apparatus of FIG. 1.
Figure 2A:
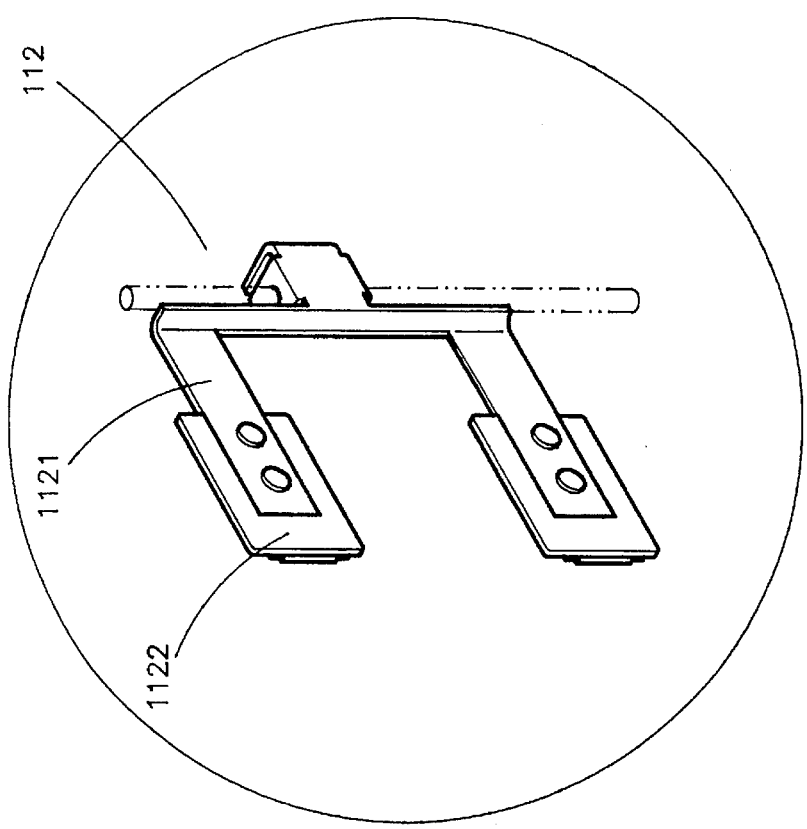
Figure 4:
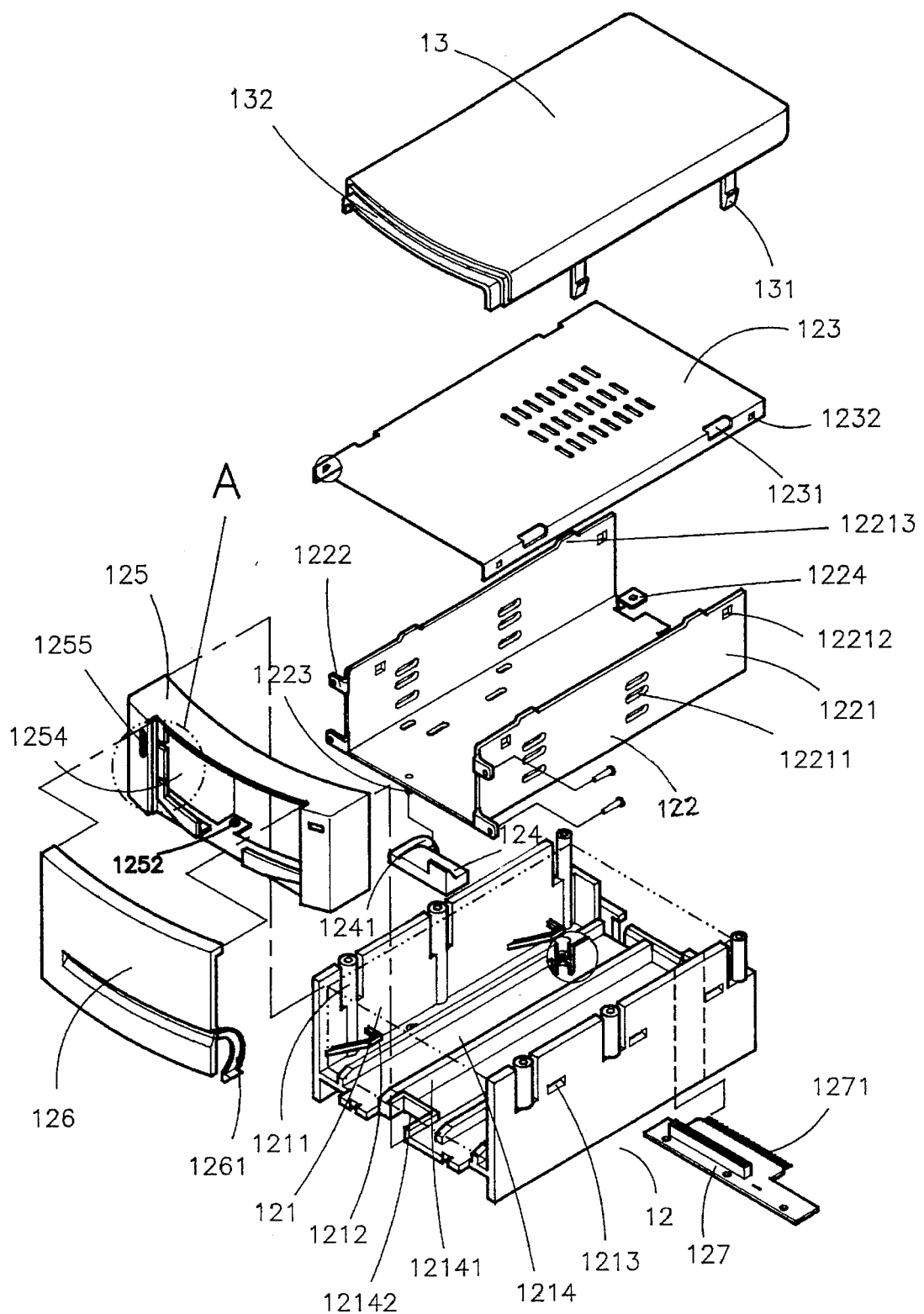
FIG. 4 is an exploded view of the inner casing of the mainframe housing of the computer peripheral apparatus of FIG. 1.
Figure 4A:
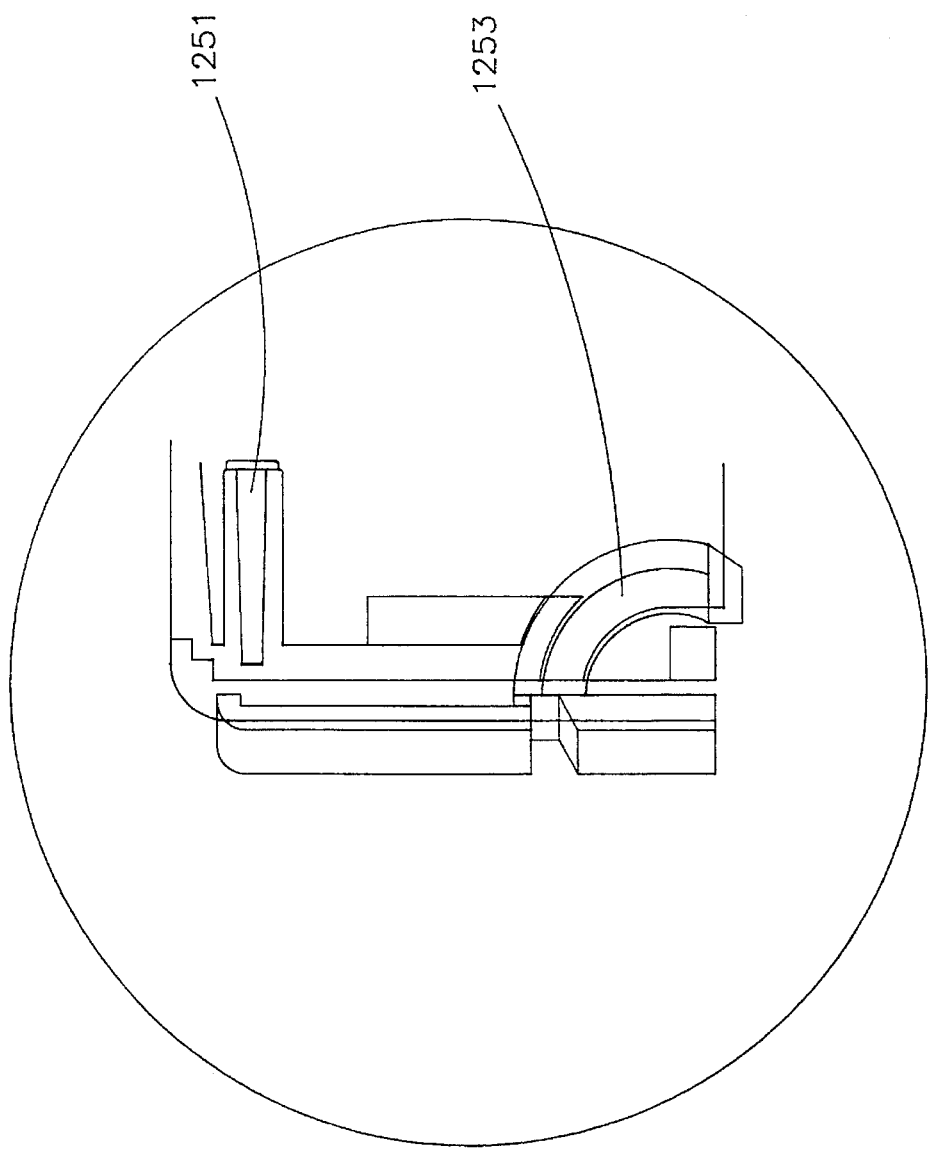
Figure 6:
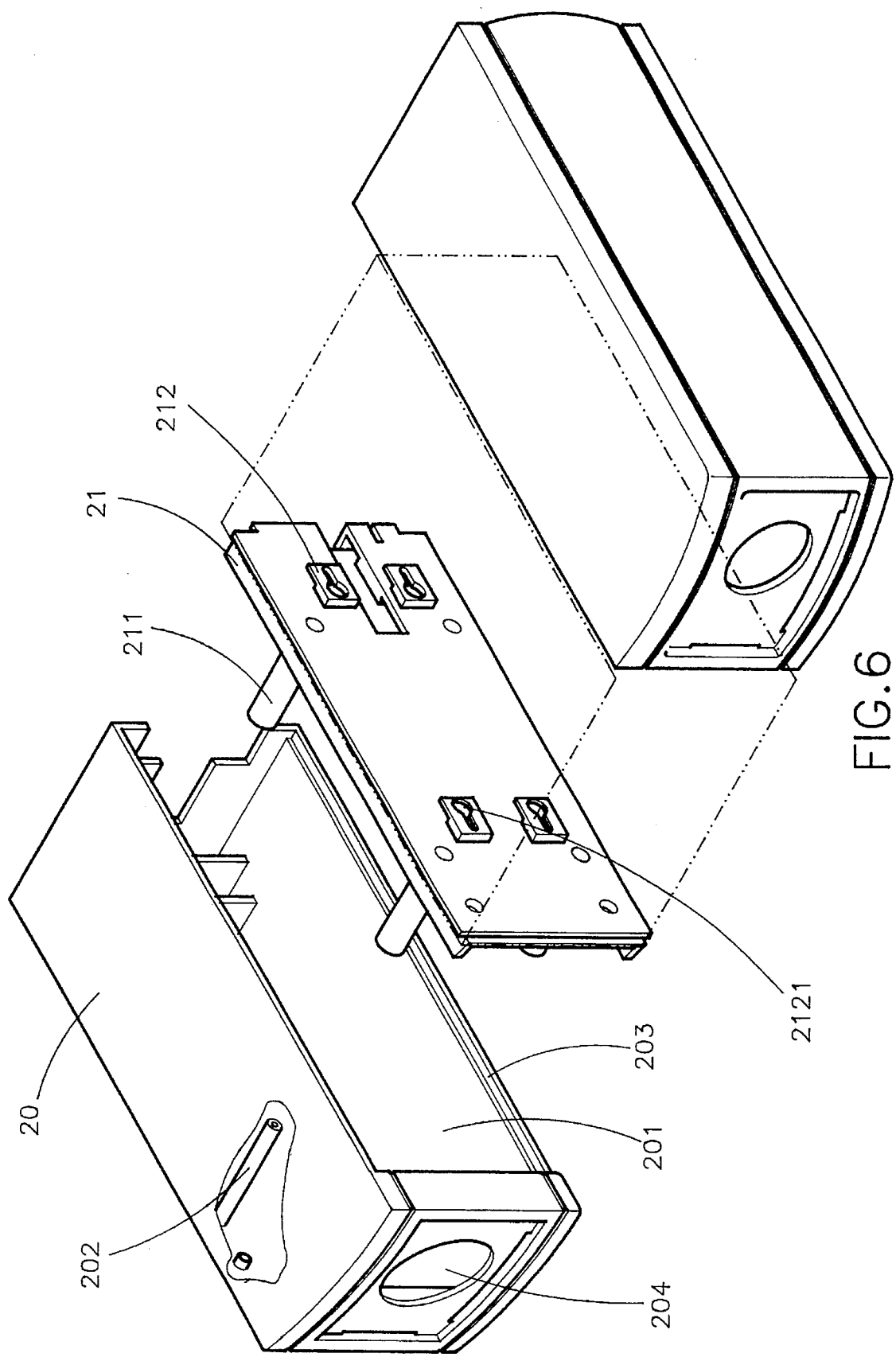
FIG. 6 is an exploded view of a speaker housing according to the present invention.
Figure 7:
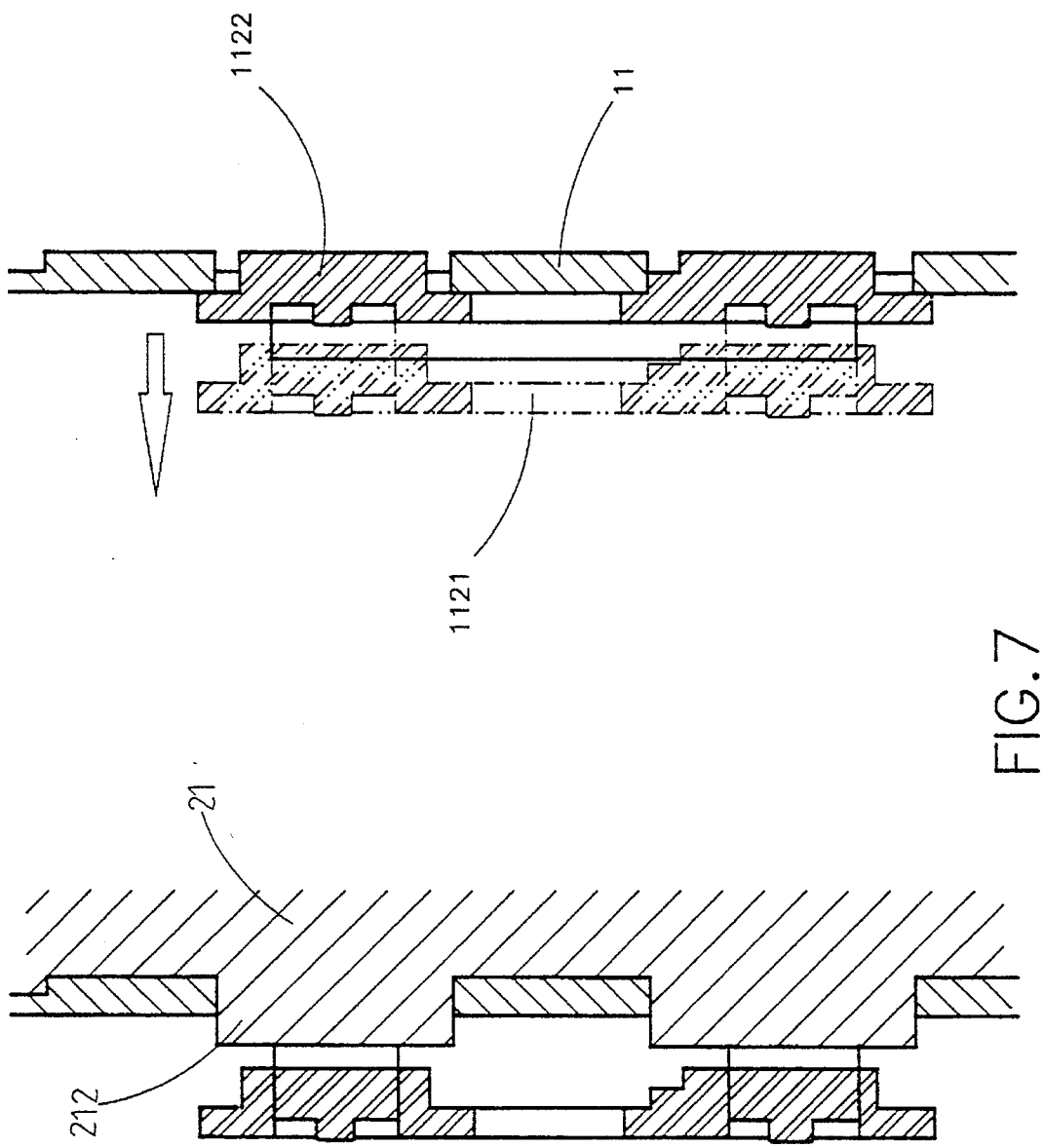
FIG. 7 is a sectional view in an enlarged scale showing the relative position of a spring device on the outer casing according to the present invention.

Referring to FIGS. 1 through 6, a computer peripheral apparatus in accordance with the present invention is generally comprised of a mainframe housing 10 and two speaker housings 20 fastened to two opposite sides of the mainframe housing 10. The mainframe housing 10 is comprised of an outer casing 11, an inner casing 12, and a top cover 13. The outer casing 11 comprises two opposite upright walls 111 at two opposite lateral sides, a plurality of vertical ribs 1111 respectively raised from the upright walls 111 inside the outer casing 11, symmetrical top cover mounting holes 11112 and symmetrical speaker housing mounting holes 11113 respectively made on the upright walls 111 at different elevations for mounting the bottom hooks 131 of the top cover 13 and the retainer lugs 212 of the speaker housings 20, a plurality of spring devices 112 respectively fastened to the upright walls 111, which blocks the speaker housing mounting holes 11113 when the speaker housings 20 are detached from the mainframe housing 10, a receiving chamber 113 defined between the upright walls 111, a plurality of upright supports 1131 and upright posts 1132 disposed in the receiving chamber 113, an inside frame 114 received in the receiving chamber 113, a vertical front wall 115, a plurality of retaining holes 1153 on the vertical front wall 115, vertical and horizontal flanges 1151 and 1152 on the vertical front wall 115, a front panel 116 fastened to the vertical front wall 115, a plurality of screw holes 1133 near the rear end, a rear panel 117 having inward bottom lugs 1171 respectively fastened to the screw holes 1133 and hooked portions 1172 fastened to the inside frame 114, a partition board 118 fastened to posts 1173 on the rear panel 117, and an electric connector 119 fastened to posts 1181 on the partition board 118. The rear panel 117 further comprises a plurality of through holes 1174 for passing output terminals (not shown). The front panel 116 comprises a plurality of backward hooks 1161 respectively hooked in the retaining holes 1153 on the vertical front wall 115, a plurality of press buttons 1162 for different operation controls, and a plurality of indicator lamps 1163 corresponding to the press buttons 1162. The inside frame 114 comprises a flat bottom wall 1141, a plurality of through holes 1142, which receive the upright supports 1131 and the upright posts 1132, a vertical front wall 1143 having hooked portions 11431 and 11432 respectively hooked on the vertical and horizontal flanges 1151 and 1152 of the vertical front wall 115 of the outer casing 11, and two opposite rear flanges 1144 respectively connected to hooked portions 1172 of the rear panel 117. The spring device 112 comprises a shaft holder 11211, which has two parallel lugs 11212 with a respective axle hole 112121, a shaft 11214 inserted through the axle holes 112121 on the parallel lugs 11212 of the shaft holder 11211, a spring plate 11213 fastened to the shaft 11214 and having rows of dowel holes 112131 at different elevations, two pads 1122 respectively fastened to the dowel holes 112131 of the spring plate 11213. The pads 112 each has a recess 11221 and a plurality of dowels 11222 raised from the recess 11221. By fitting the dowels 11222 of the pads 1122 into the dowel holes 112131 of the spring plate 11213, the pads 1122 are respectively fastened to the spring plate 11213 at different elevations. When the speaker housings 20 are respectively removed from the mainframe housing 10, the pads 112 of the spring devices 112 are respectively forced by the spring plates 112 into the symmetrical speaker housing mounting holes 11113 on the upright walls 111 of the outer casing 11 to close the speaker housing mounting holes 11113 in a flush manner. The inner casing 12 comprises two upright walls 121 at two opposite lateral sides, a plurality of supporting posts 1211 aligned on the upright walls 121, a plurality of retaining elements 1212 raised from the upright walls 121 for holding the two opposite sides of a diskdrive housing 122, a plurality of retaining holes 1213 on the upright walls 121 for mounting the bottom hooks 121a of an inside case 12a, a receiving chamber 1214 defined between the upright walls 121, a plurality of longitudinal rails 12141 inside the receiving chamber 1214, a front opening 12142 on the receiving chamber 1214, a release control block 124 moved in the front opening 12142, a plurality of mounting rods 1215 respectively connected to the upright supports 1131 of the outer casing 11, a diskdrive housing 122 received in the receiving chamber 1214, a diskdrive cover 123 covered on the diskdrive housing 122 at the top, a front panel holder 125, and a front panel 126. The diskdrive housing 122 comprises two opposite upright walls 1221 at two opposite sides, a plurality of screw holes 12211 for fastening a diskdrive inside the diskdrive housing 122, a plurality of retaining holes 12212 and retainer portions 12213 respectively connected to respective retaining holes 1231 and retainer portions 1232 on the diskdrive cover 123, a plurality of mounting lugs 1222 respectively connected to respective screw holes 1251 on the front panel holder 125, a bottom rod 1223 for holding the release control block 124, a plurality of rear mounting lugs 1224, a terminal connector 127 fastened to the rear mounting lugs 1224 for connection to the electric connector 119. The front panel holder 125 comprises two curved mounting slots 1253 for mounting the front panel 126, a mounting lug 1252 for mounting the release control block 124, a front opening 1254, and a latch release 1255 to hold the front panel 126 in the closed position. The release control block 124 is connected between the bottom rod 1223 of the diskdrive housing 122 and the mounting lug 1252 on the front panel holder 125. The front panel 126 has two curved mounting rods 1261 inserted into the curved mounting slots 1253 on the front panel holder 125, and therefore the front panel 126 can be moved along the curved mounting slots 1253 to close or open the front opening 1254 of the front panel holder 125. The top cover 13 has a plurality of bottom hooks 131 respectively hooked in the top cover mounting holes 11112 on the upright walls 111 of the outer casing 11, and a stepped front flange 132 to support the front panel holder 125, permitting the top side of the front panel holder 125 to be disposed flush with the top side of the top cover 13. The speaker housing 20 comprises an inside chamber 201, a plurality of mounting rods 202 inside the inside chamber 201, a mounting groove 203 on the bottom of the inside chamber 201 at an outer side, a side board 21 fastened to the mounting rods 202 and the mounting groove 203 to close the inside chamber 201, and a speaker output port 204 at the front side. The side board 21 comprises a plurality of mounting tubes 211 respectively sleeved onto the mounting rods 202, a plurality of retainer lugs 212 respectively fastened to the speaker housing mounting holes 11113 on the outer casing 11, and a plurality of hanging holes 2121 respectively made on the retainer lugs 212. Through the hanging holes 2121, the speaker housing 20 can be hung on a nail or the like when the speaker housing 20 is not used.

Referring to FIGS. 1–7, when the inside frame 114 is put in the receiving chamber 113 of the outer casing 11, the retaining holes 1153 of the vertical front wall 115 are respectively fastened to the backward hooks 1161 of the front panel 116, then the screw holes 1133 of the outer casing 11 are respectively the bottom lugs 1171 of the rear panel 117, and then the hooked portions 1172 are respectively fastened to the rear flanges 1144 of the inside frame 114, and then the upright supports 1131 of the outer casing 11 are respectively fastened to the mounting rods 1215, and then the diskdrive housing 122 is inserted into the receiving chamber 1214 of the inner casing 12, and then the top cover 13 is fastened to the outer casing 11 by fastening the hooks 131 of the top cover 13 to the retaining holes 11112. After the mainframe housing 10 is assembled, the speaker housings 20 are respectively fastened to the mainframe housing 10 at two opposite sides by fastening the retainer lugs 212 of the side boards 21 of the speaker housings 20 to the speaker housing mounting holes 11113 of the upright walls 111 of the outer casing 11 of the mainframe housing 10.

Figure 8:
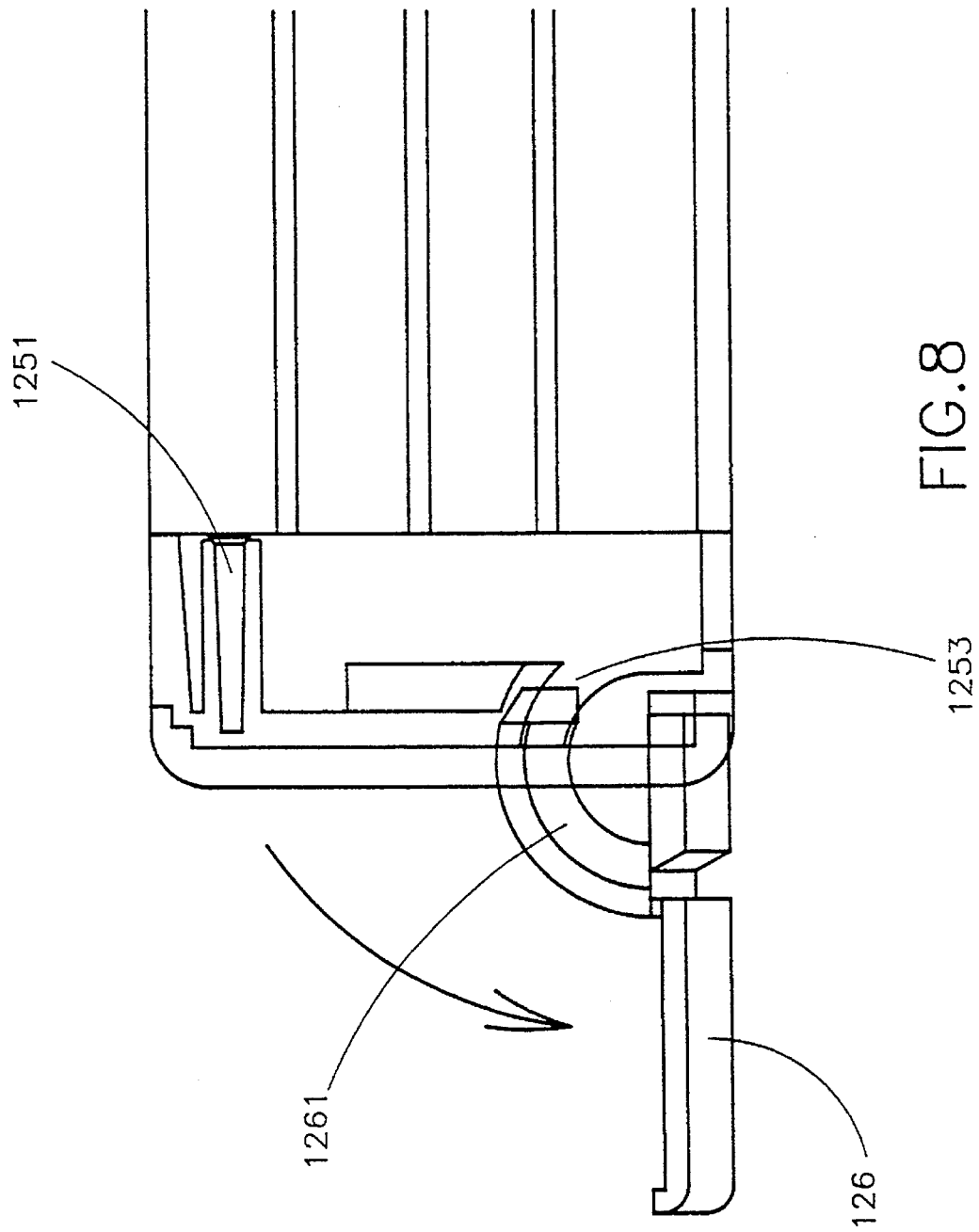
FIG. 8 shows the front panel of the inner casing moved relative to the front panel holder according to the present invention.
Figure 9:
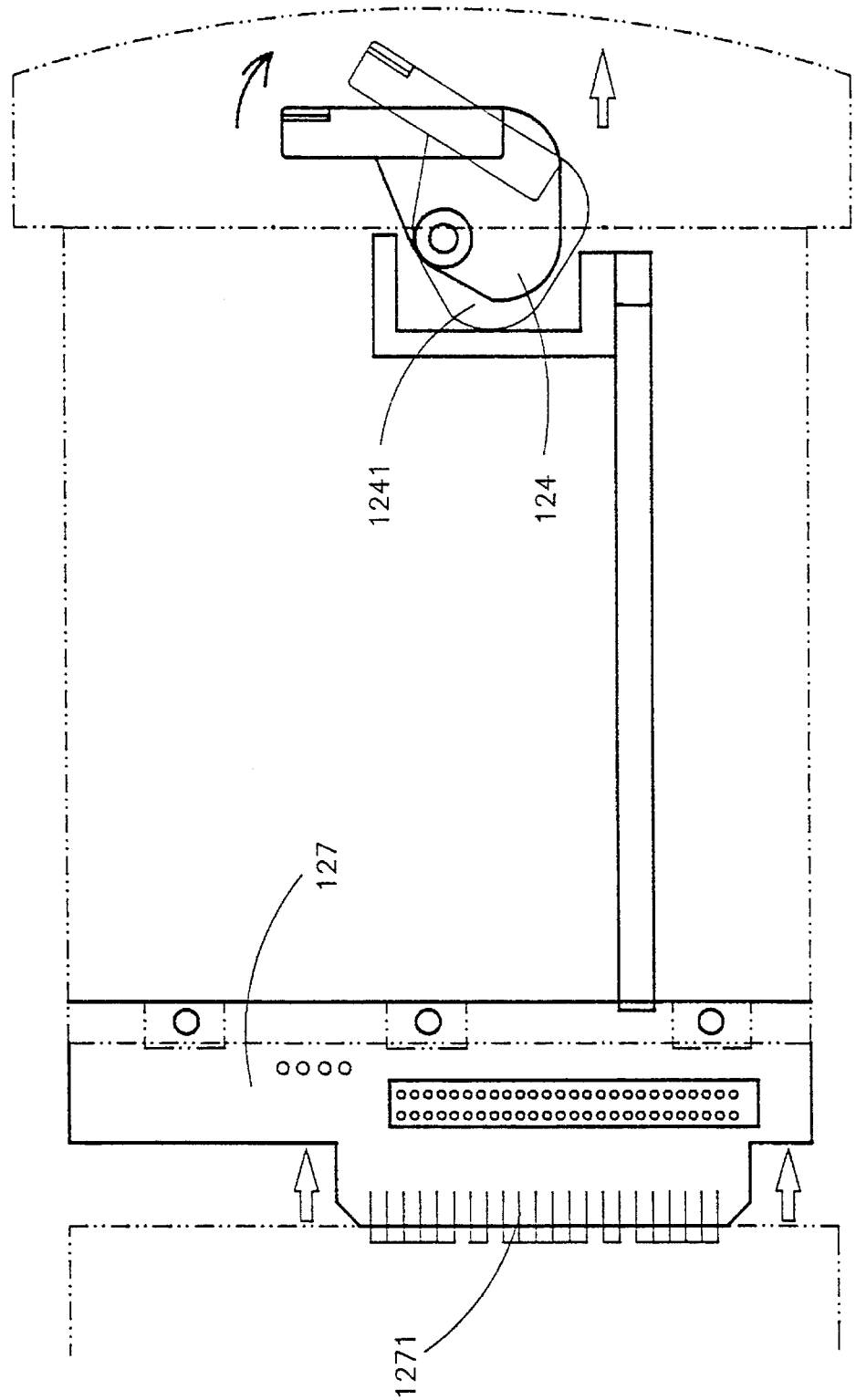
FIG. 9 is a schematic drawing showing the moving direction of the release control block on the inner casing according to the present invention.
Figure 10:
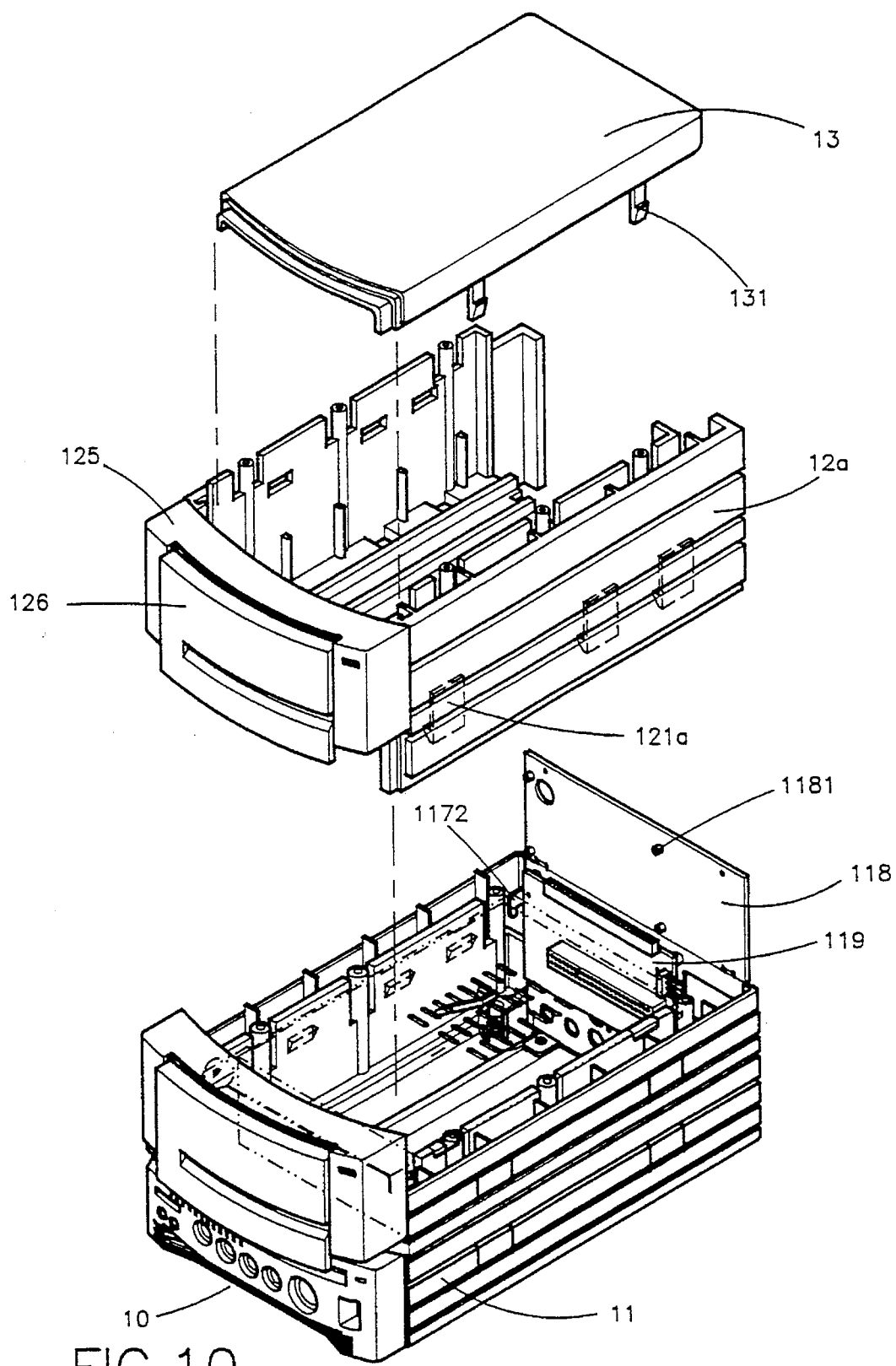
FIG. 10 shows the relative positioning of an inside case in the outer casing according to the present invention.
Figure 11:
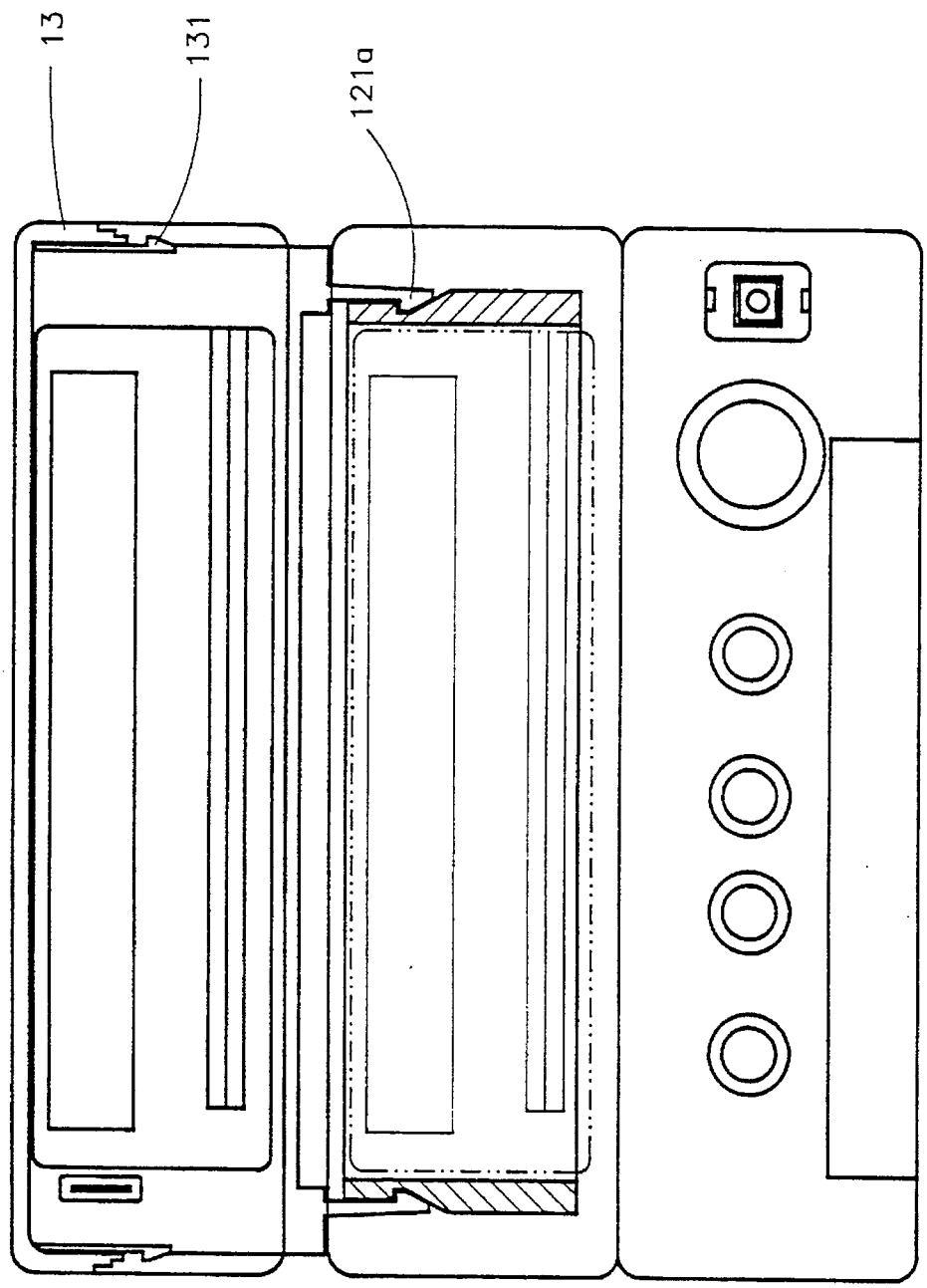
FIG. 11 is a rear view in an enlarged scale, showing an inside case installed.
Figure 12:
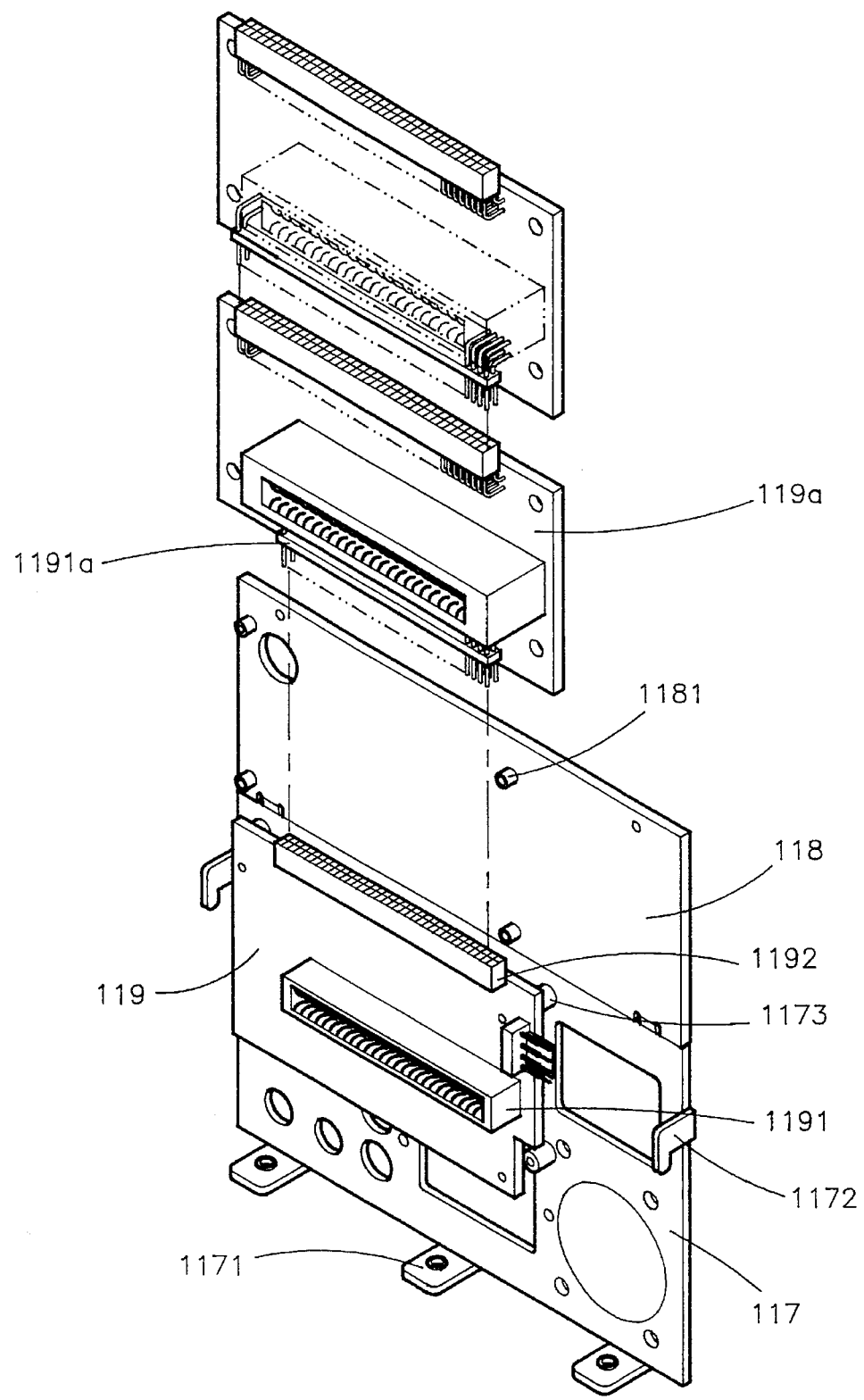
FIG. 12 shows the installation of additional electric connectors to the electric connector on the rear panel of the outer casing.
Figure 13:
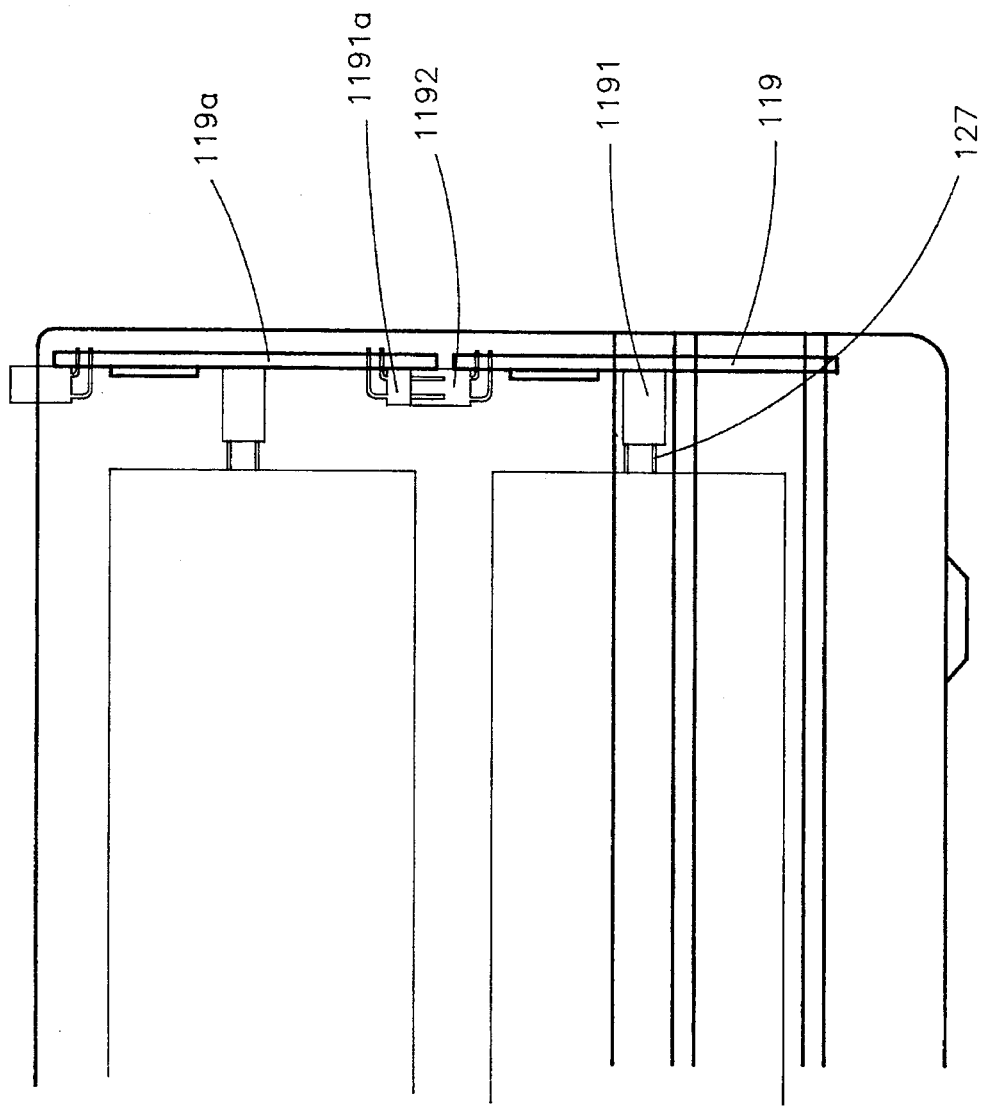
FIG. 13 is a sectional side view of an embodiment of the present invention.
Figure 14:
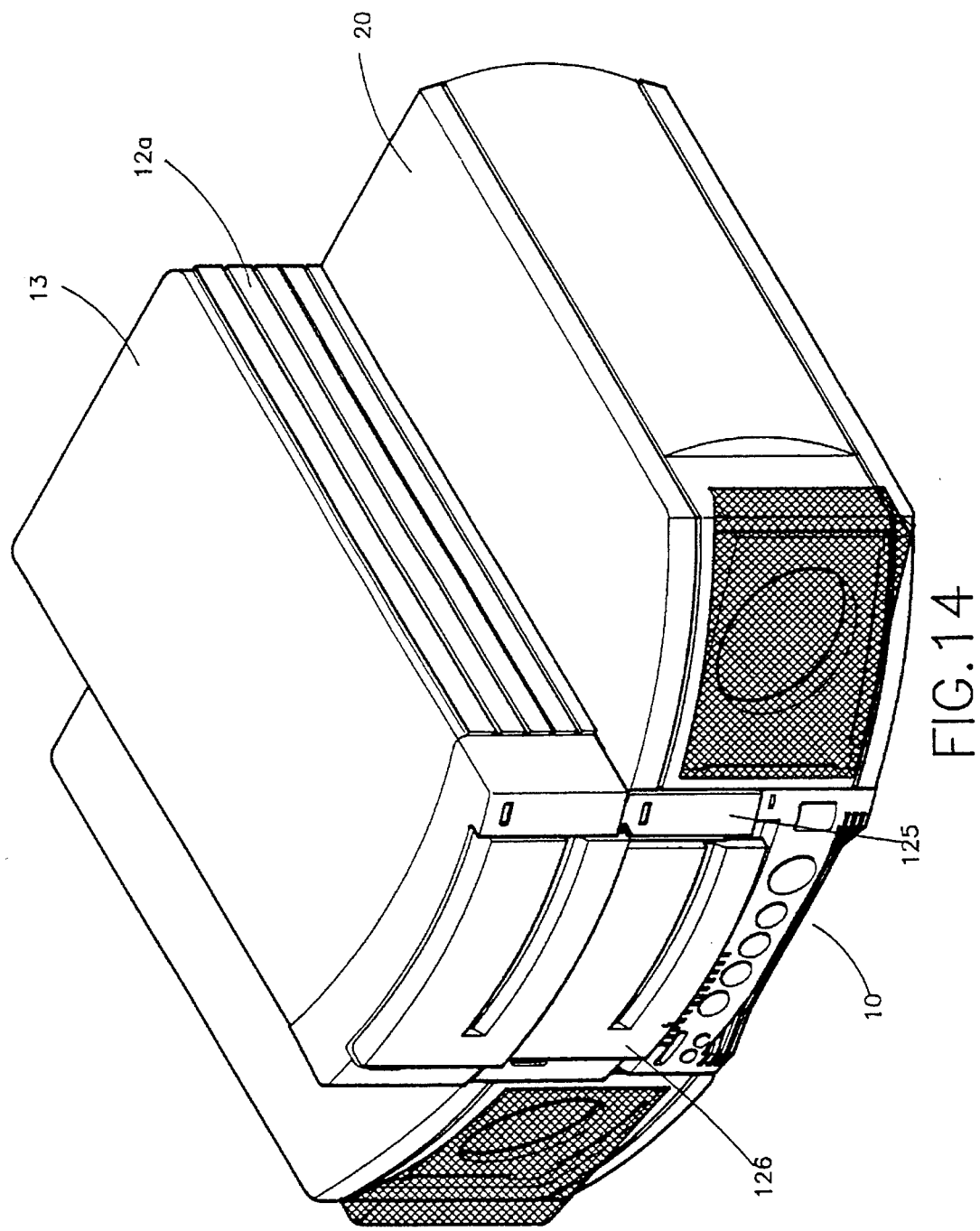
FIG. 14 is a perspective view of an embodiment of the present invention.

Referring to FIGS. 8 and 9, when the latch release 1255 of the front panel holder 125 is depressed, the front panel 126 can then be turned outwards to open the front opening 1254 of the front panel holder 125 for loading a diskdrive. Furthermore, when the release control block 124 is turned to move the arched surface portion 1241 thereof into the front opening 12142, the diskdrive housing 122 is forced upwards, causing the terminal connector 127 of the diskdrive housing 122 to detach from the electric connector 119, and therefore the diskdrive housing 122 can be removed from the inner casing 12.

Referring to FIGS. 10–14, the inside case 12a can be fastened to the inner casing 12 by fastening the bottom hooks 121a to the retaining holes 1213 on the upright walls 121 of the inner casing 12. After the inside case 12a is fastened to the inner casing 12, the top cover 13 is then put on the inside case 12a, and the pins 1271 of the terminal connector 127 are respectively fastened to the mounting holes 1191 on the electric connector 119 for mounting a diskdrive by an electric connector 119a. The electric connector 119a has downward male contacts 1191a for connection to respective female contacts 1192 on the electric connector 119. The inside case 12a is similar to the inside casing 12. The only difference between the inside case 12a and the inside casing 12 is that the inside case 12a has downward hooks 121a.

While only one embodiment of the present invention has been shown and described, it will be understood that various modifications and changes could be made without departing from the spirit and scope of the invention.

What is claimed is:

1. A computer peripheral apparatus comprising a mainframe housing (10) and two speaker housings (20) fastened to said mainframe housing (10) at two opposite sides, said mainframe housing (10) comprised of an outer casing (11), an inner casing (12), and a top cover (13), said outer casing (11) comprising two opposite upright walls (111) at two opposite lateral sides, a plurality of vertical ribs (1111) respectively raised from the upright walls (111) of said outer casing (11) on the inside, a plurality of symmetrical top cover mounting holes (11112) and a plurality of symmetrical speaker housing mounting holes (11113) respectively made on the upright walls (111) of said outer casing (11) at different elevations for mounting said top cover (12) and said speaker housings (20), a plurality of spring devices (112) respectively fastened to the upright walls (111) of said outer casing (11) to block said speaker housing mounting holes (11113) when said speaker housings (20) are detached from said mainframe housing (10), a receiving chamber (113) defined between the upright walls (111) of said outer casing (11), a plurality of upright supports (1131) and upright posts (1132) disposed in the receiving chamber (113) of said outer casing (11) for mounting a circuit board, an inside frame (114) received in the receiving chamber (113) of said outer casing (11), a vertical front wall (115), a plurality of retaining holes (1153) on the vertical front wall (115) of said outer casing (11), vertical and horizontal flanges (1151 and 1152) on the vertical front wall (115) of said outer casing (11), a front panel (116) fastened to the vertical front wall (115) of said outer casing (11), a plurality of screw holes (1133) near a rear end thereof, a rear panel (117) having inward bottom lugs (1171) and hooked portions (1172) respectively fastened to the screw holes (1133) and inside frame (114) of said outer casing (11), a partition board (118) fastened to posts (1173) on said rear panel (117), and an electric connector (119) fastened to posts (1181) on said partition board (118), said rear panel (117) having a plurality of through holes (1174) for passing output terminals, the front panel (116) of said outer casing (11) comprising a plurality of backward hooks (1161) respectively hooked in the retaining holes (1153) on said vertical front wall (115), a plurality of press buttons (1162) for different operation controls, and a plurality of indicator lamps (1163) corresponding to said press buttons (1162), the inside frame (114) of said outer casing (11o) comprising a flat bottom wall (1141), a plurality of through holes (1142), which receive the upright supports (1131) and the upright posts (1132) of said outer casing (11), a vertical front wall (1143) having hooked portions (11431 and 11432) respectively hooked on said vertical and horizontal flanges (1151 and 1152) of said vertical front wall (115), and two opposite rear flanges (1144) respectively connected to the hooked portions (1172) of said rear panel (117), said spring devices each comprising a shaft holder (11211) having two parallel lugs (11212) with a respective axle hole (112121), a shaft (11214) inserted through the axle holes (112121) on said parallel lugs (11212) of said shaft holder (11211), a spring plate (11213) fastened to the shaft (11214) and having rows of dowel holes (112131) at different elevations, two pads (112) respectively fastened to the dowel holes (112131) on said spring plate (11213), said pads (112) each having a recess (11221) and a plurality of dowels (11222) raised from said recess (11221) and respectively fitted into the dowel holes (112131) on said spring plate (11213), said inner casing (12) comprising two upright walls (121) at two opposite lateral sides, a plurality of supporting posts (1211) and a plurality of retaining elements (1212) on the upright walls (121) of said inner casing (12) for holding a diskdrive housing (122), a plurality of retaining holes (1213) on the upright walls (121) of said inner casing (11) for mounting the bottom hooks (121a) of an inside casing (12a), a receiving chamber (1214) defined between the upright walls (121) of said inner casing (12), a plurality of longitudinal rails (12141) inside the receiving chamber (1214) of said inner casing (12), a front opening (12142) between said longitudinal rails (12141), a release control block (124) moved in the front opening (12142) of said inner casing (12), a plurality of mounting rods (1215) respectively connected to the upright supports (1131) of said outer casing (11), a diskdrive housing (122) received in the receiving chamber (1214) of said inner casing (12), a diskdrive cover (123) covered on said diskdrive housing (122), a front panel holder (125), and a front panel (126), said diskdrive housing (122) comprising two opposite upright walls (1221), a plurality of screw holes (12211) for fastening a diskdrive inside said diskdrive housing (122), a plurality of retaining holes (12212) and retainer portions (12213) respectively fastened to respective retaining holes (1231) and retainer portions (1232) on said diskdrive cover (123), a plurality of mounting lugs (1222) respectively connected to respective screw holes (1251) on said front panel holder (125), a bottom rod (1223) for holding said release control block (124), a plurality of rear mounting lugs (1224), a terminal connector (127) fastened to the rear mounting lugs (1224) of said diskdrive housing (124) for connection to said electric connector (119), said front panel holder (125) comprising two curved mounting slots (1253) for mounting the front panel (126) of said inner casing (12), a mounting lug (1252) for mounting said release control block (124), a front opening (1254), and a latch release (1255) to hold the front panel (126) of said inner casing (12) in a closed position closed on the front opening (1254) of said inner casing (12), said release control block (124) being pivotably connected between the bottom rod of said diskdrive housing (122) and the mounting lugs (1252) on said front panel holder (125), the front panel (126) of said inner casing (12) having two curved mounting rods (1261) inserted into the curved mounting slots (1253) on said front panel holder (125) and being moved along said curved mounting slots (1253) to close or open the front opening (1254) of said front panel holder (125), said top cover (13) having a plurality of bottom hooks (131) respectively hooked in the top cover mounting holes (11112) on the upright walls (111) of said outer casing (11), and a stepped front flange (132) to support said front panel holder (125), said speaker housings each comprising an inside chamber (201), a plurality of mounting rods (202) inside the inside chamber (201), a mounting groove (203), a side board fastened to the mounting rods (202) and the mounting groove (203) to close the inside chamber (201), and a speaker output port (204) at a front side thereof, the side boards (21) of said speaker housing (20) having a plurality of mounting tubes (211) respectively sleeved onto the mounting rods (202) of the respective speaker housings (20), a plurality of retainer lugs (212) respectively fastened to the speaker housing mounting holes (11113) on said outer casing (11), and a plurality of hanging holes (2121) on the retainer lugs (212) for hanging.

2. The computer peripheral apparatus of claim 1 wherein said latch release (1255) of said front panel holder (125) is depressed, the front panel (126) of said inner casing (12) can than be turned outwards to open the front opening (1254) of said front panel holder (125) for loading a diskdrive; said release control block (124) has an arched surface portion (1241) and can be turned to move said arched surface portion (1214) into the front opening (12142) on said inner casing (12) to lift said diskdrive housing (122), causing said terminal connector (127) to be disconnected from said electric connector (119) for allowing said diskdrive housing (122) to be removed out of said inner casing (12).

3. The computer peripheral apparatus of claim 1 further comprising an supplemental inside case (12a) for detachably fastening to said inner casing (12) for holding a diskdrive, said inside case (12a) having a plurality of bottom hooks (121a) for fastening to the retaining holes (1213) on the upright walls (121) of said inner casing (12), having an electric connector (119a) fastened to the electric connector (119) on said outer casing (11).

4. A computer peripheral apparatus comprising:

a mainframe housing having an outer casing, an inner casing and a top cover;

the outer casing having a first pair of opposing sides, each side having a plurality of speaker mounting holes, a front wall and a rear panel, a first chamber being defined by the first pair of opposing sides, the front wall and the rear panel for receiving the inner casing;

the inner casing having a second pair of opposing sides and a front panel, a second chamber being defined by the second pair of opposing sides and the front panel for receiving a diskdrive;

the cover attaching to cover mounting holes located on the first pair of opposing sides; and a pair of speaker housings, one speaker housing being detachably mounted on the outside of each of the first pair of opposing sides using the plurality of speaker mounting holes;

wherein each of the mounting holes is provided with blocking means for blocking the mounting hole when the speaker housing is detached.

5. The computer peripheral apparatus of claim 4, wherein the top cover further comprises a plurality of cover hooks, the outer casing further comprises a rear panel having electrical connecting means for connecting to a diskdrive, each of the first pair of sides has a plurality of cover mounting holes for receiving the plurality of cover hooks, and the inner casing further comprises a front panel attached to the inner casing by hinging means.

* * * * *

UNITED STATES PATENT AND TRADEMARK OFFICE
CERTIFICATE OF CORRECTION

PATENT NO. : 5,519,572

DATED : May 21, 1996

INVENTOR(S) : Luo

It is certified that error appears in the above-identified patent and that said Letters Patent is hereby corrected as shown below:

Col. 2, line 14 delete "and" after the word "installed;"

Col. 7, line 1 "(1214)" should read --(1241)--

Col. 2, line 17, the "." (period) should be a --;-- (semi colon)

Col. 19, line 19, the "." (period) should be --; and--.

Signed and Sealed this

Eleventh Day of February, 1997

Attest:

BRUCE LEHMAN

Attesting Officer    Commissioner of Patents and Trademarks